Jan. 17, 1933.　　　　N. C. PHILLIPS　　　　1,894,571
APPARATUS FOR HEAT TREATING MATERIALS
Original Filed Dec. 9, 1929　　4 Sheets-Sheet 1

Jan. 17, 1933.   N. C. PHILLIPS   1,894,571
APPARATUS FOR HEAT TREATING MATERIALS
Original Filed Dec. 9, 1929   4 Sheets-Sheet 2
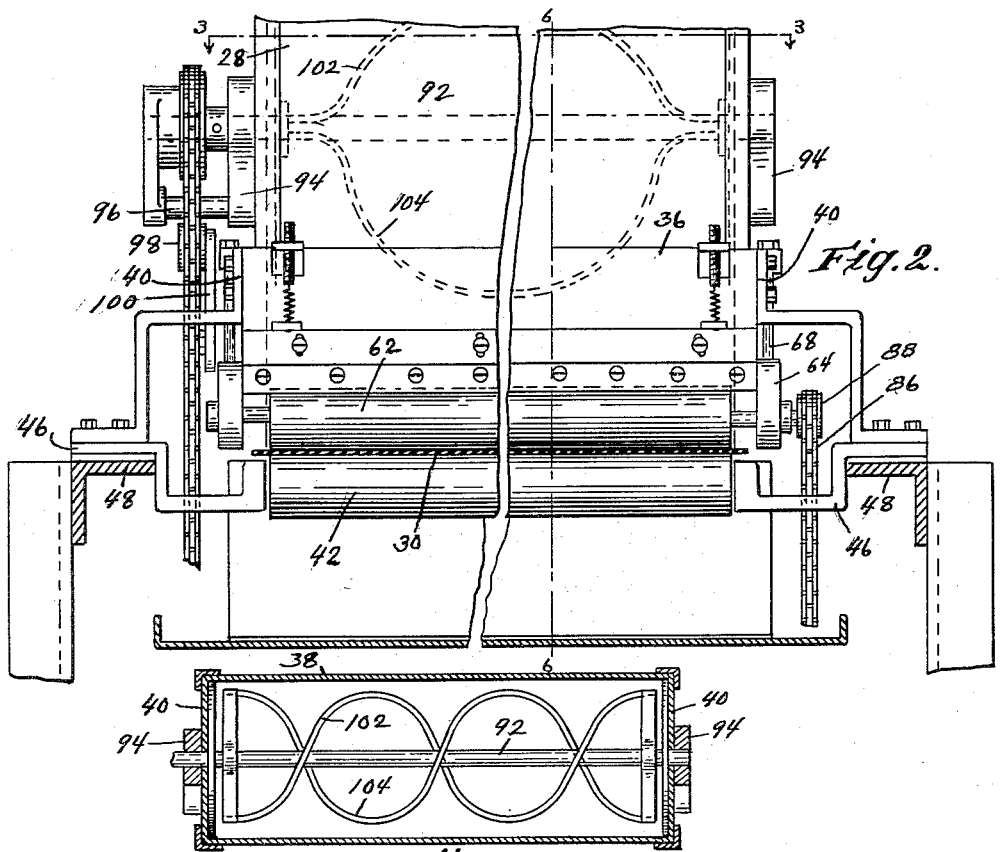
Fig. 2.
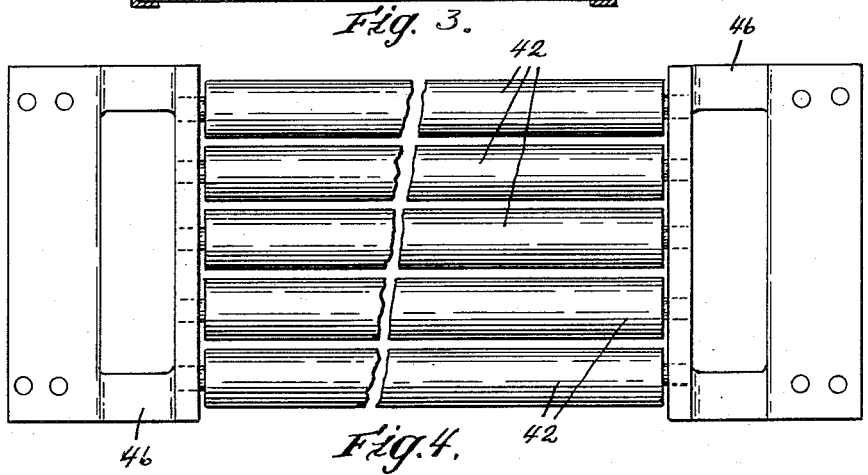
Fig. 3.
Fig. 4.
Inventor.
Nathan Carlton Phillips

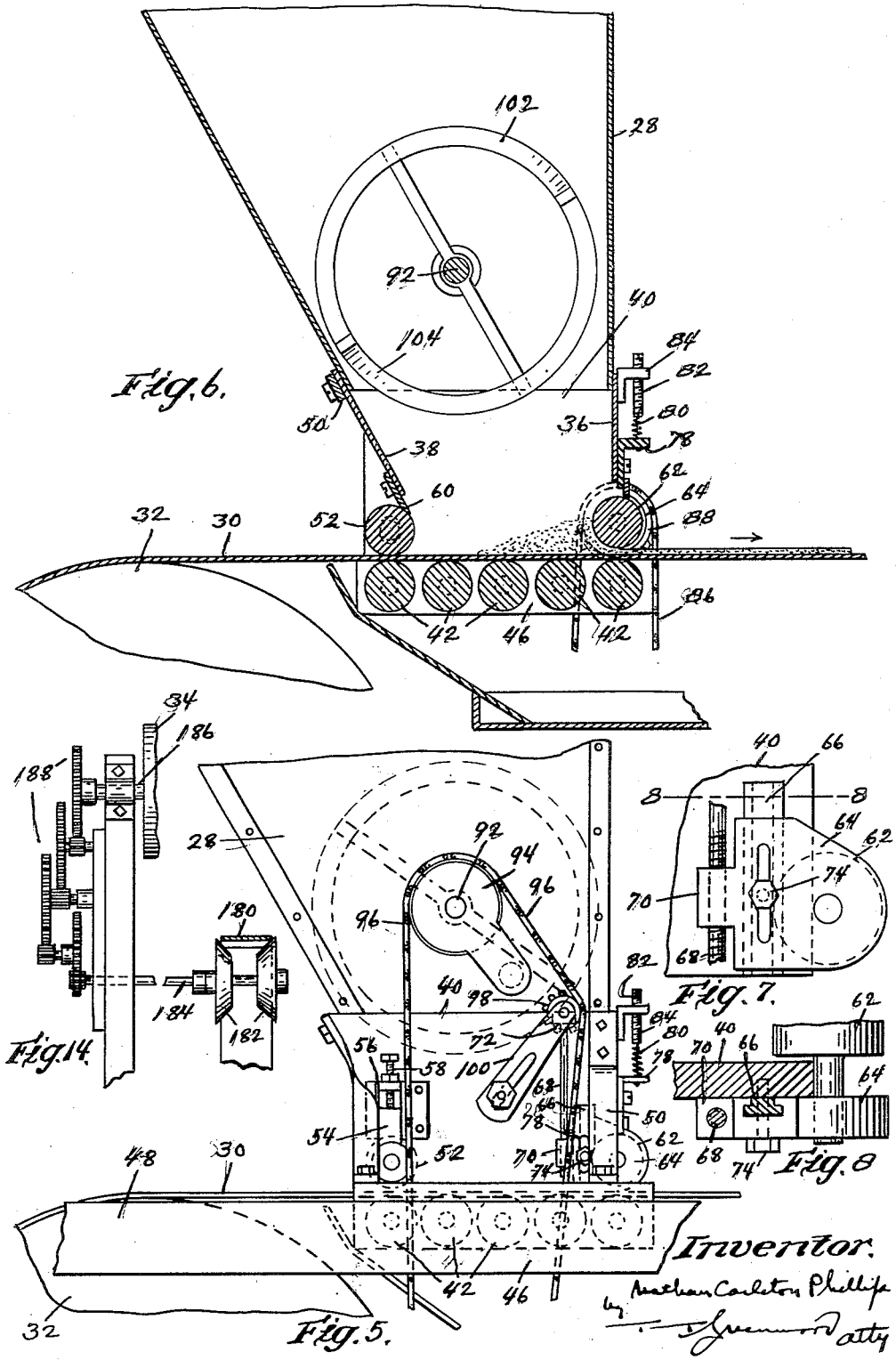

Jan. 17, 1933.  N. C. PHILLIPS  1,894,571
APPARATUS FOR HEAT TREATING MATERIALS
Original Filed Dec. 9, 1929  4 Sheets-Sheet 4
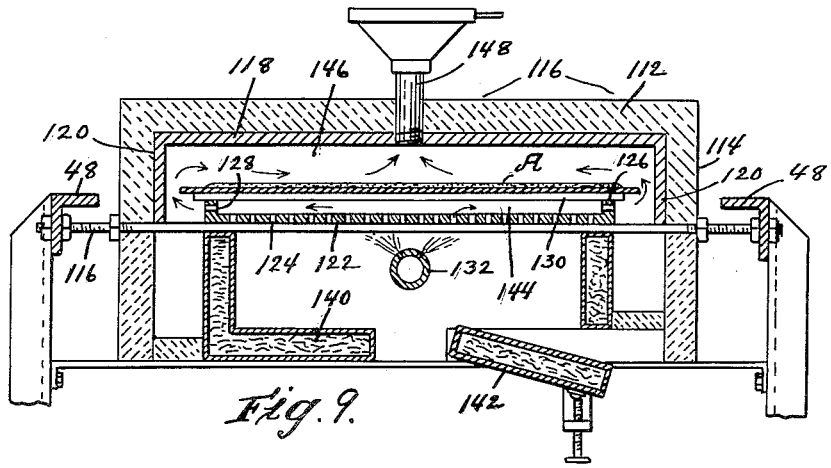
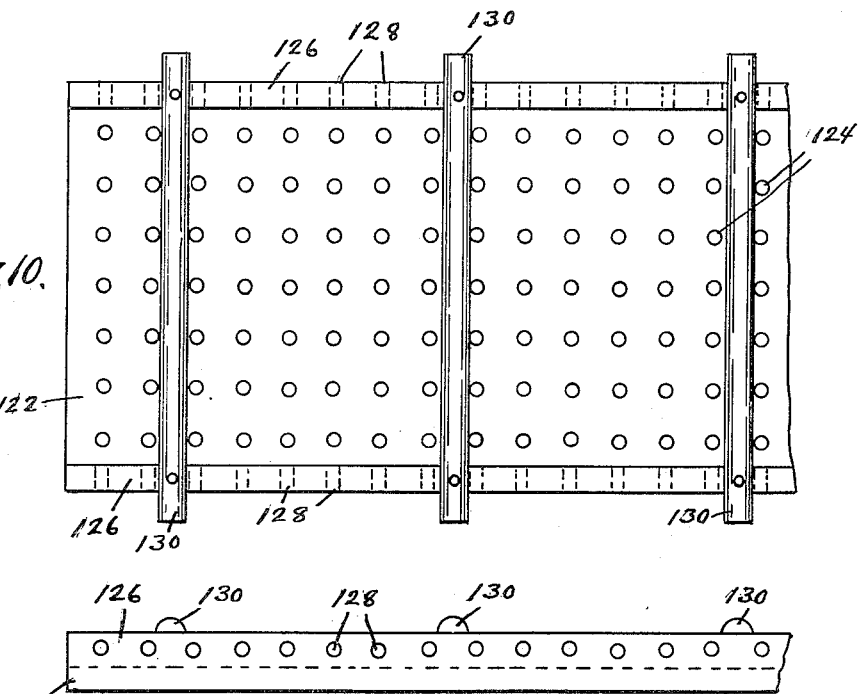

Patented Jan. 17, 1933

1,894,571

UNITED STATES PATENT OFFICE

NATHAN CARLETON PHILLIPS, OF GLOUCESTER, MASSACHUSETTS, ASSIGNOR TO RUSSIA CEMENT COMPANY, OF GLOUCESTER, MASSACHUSETTS, A CORPORATION OF MASSACHUSETTS

APPARATUS FOR HEAT TREATING MATERIALS

Original application filed December 9, 1929, Serial No. 412,614, and in Canada June 27, 1930. Divided and this application filed April 6, 1931. Serial No. 528,064.

This invention relates to a machine for conveying powdered material in a thin continuous layer and for heat treating the material, and particularly for the conversion of starch into dextrine and various starch derivatives. This application is a division of my copending application Serial No. 412,-614, filed December 9, 1929.

For many years dextrine has been made commercially by impregnating starch powder with acid or other chemical material or materials and subjecting large lots in powder form to heat under agitation for many hours.

By my invention, starch impregnated as heretofore is fed as a powder onto a moving belt in a uniform layer, preferably thin, and carried through a heating chamber, preferably sectionalized, in which it is subjected to a predetermined, controlled heat by which it is dried (if not already dry), converted to dextrine and cooled and then dropped into a hopper dextrinized as completely as desired.

Uniformity of product is of the utmost importance in adhesives as envelope and box-making machines are adjusted to operate according to the character of the adhesives. A variation between lots of adhesives supplied to a machine may render the machine inoperative or require a difficult readjustment of its parts by experts with serious loss of production. It is also important to produce a product having the characteristics best suited for the work to be done and not containing waste material.

Under existing systems it is very difficult to secure a sufficiently uniform product to satisfy users. Also, the product usually contains a substantial proportion of over or under-dextrinized material.

It is uncertain just what happens in the dextrinization of starch but the molecule is very complicated and a slight difference in the treatment of the starch results in substantially different products.

With the apparatus hitherto used the powdered starch is treated in large lots and, as starch powder is a very poor conductor of heat, it is impossible that the different granules shall receive the same heat for the same length of time. I believe this to be a factor in the variation between different batches and different parts of the same batch. It may well be that starch grains which do not receive identical treatment in dextrinization do not have the same molecular structure but are polymeric.

However this may be, I have found that to secure uniformity of product in lots made at different times and like dextrinization of every granule of a lot substantially equal treatment of each granule is required.

By my apparatus each granule receives substantially identical treatment as each cross section of material on the belt receives exactly the same heat at the same relative time in its progress through the machine. Many features of my machine cooperate to produce this result as will appear from the following specification.

In consequence a very uniform product is obtained both as to individual grains of the product and the characteristics of each shipment.

By my invention, dextrine may be discharged continuously from the machine as a powder in less than ten minutes from the time the impregnated starch is fed onto the belt conveyor and the total product on one of my machines far exceeds that of existing machines occupying the same space and having the same cost; and the operating expense per pound of product is less.

Furthermore, widely different products may be produced and duplicated by a variation of the materials and amounts thereof used and the conditions under which dextrinization takes place.

In the following specification, I have described a machine embodying my invention which is adapted to make a wide range of adhesives quickly and cheaply.

Fig. 2 is a fragmentary front elevation of the hopper taken along line 2—2 of Fig. 1.

Fig. 3 is a section taken along line 3—3 of Fig. 2 and illustrating the arch-breaking device of the hopper.

Fig. 4 is a plan view of the belt supporting rollers located beneath the hopper.

Fig. 5 is a detailed side elevation of the hopper.

Fig. 6 is a sectional view taken along line 6—6 of Fig. 2.

Fig. 7 is a detailed end view of the supporting bracket for the pressure roller.

Fig. 8 is a sectional detail taken along line 8—8 of Fig. 7.

Fig. 9 is a transverse sectional elevation of one of the drying ovens.

Fig. 10 is a plan view of the belt-supporting oven grid.

Fig. 11 is a side view of the grid of Fig. 10.

Fig. 12 is a sectional elevation of one of the drying ovens taken longitudinally of the belt.

Fig. 13 is a detail of the supporting and tensioning means of the idler belt pulley.

Fig. 14 is a detailed elevation of the driving gears and speed-reducing mechanism of the conveyor belt.

Figure 1:
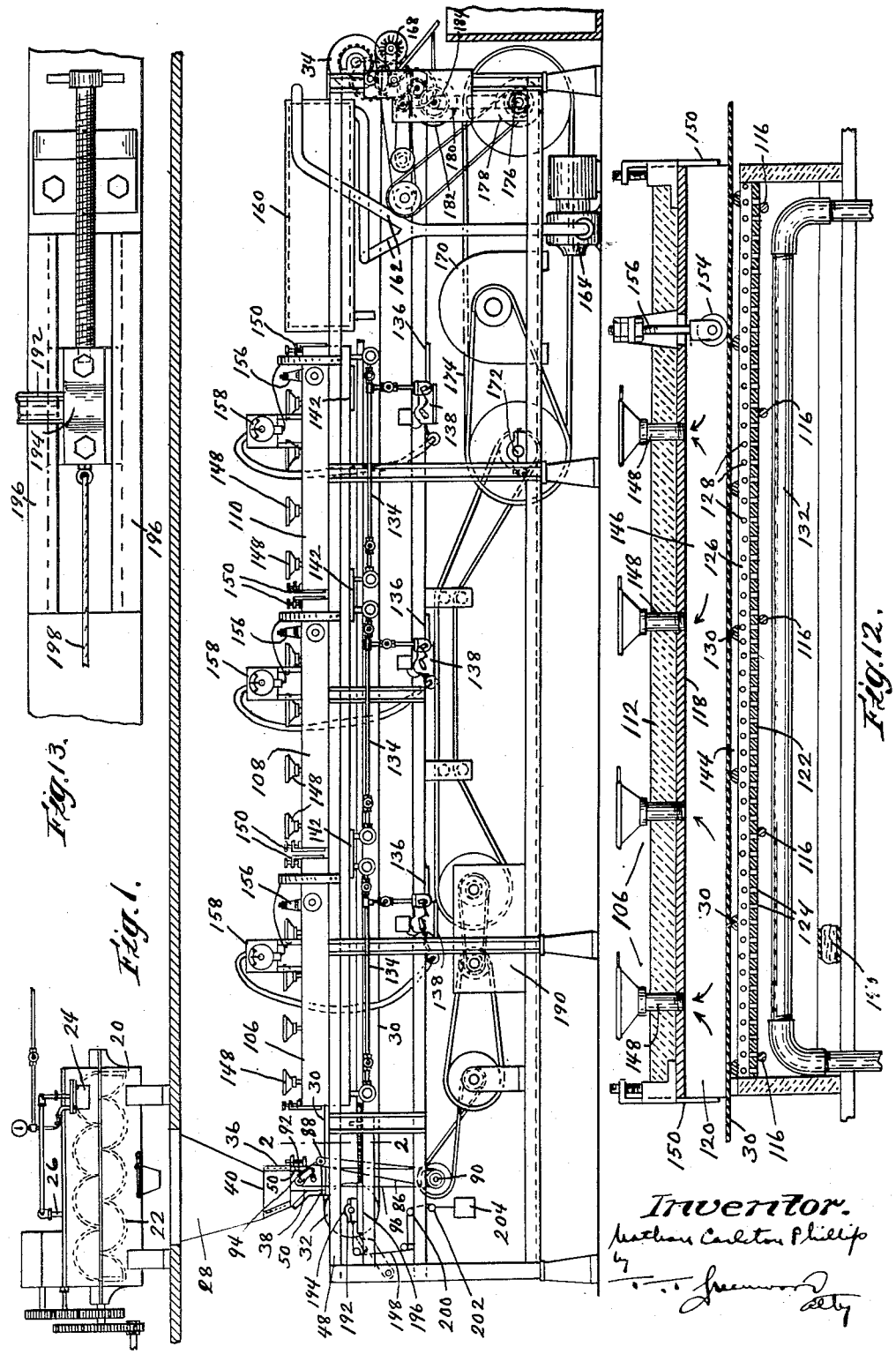
Fig. 1 is a side elevation of the apparatus used for carrying out the invention, illustrated as used for the manufacture of dextrine.

I will describe my machine as used in the manufacture of dextrine from tapioca flour. By my method twelve hundred pounds of tapioca flour as sold containing perhaps twelve per cent of water is first impregnated with twenty-five ounces of hydrochloric acid by weight mixed with one hundred ounces of water supplied to the flour under pressure as a mist in a manner well known and therefore not described or shown in the drawings in detail. The flour may be placed in a mixing device where it is kept in motion by powerful agitation or otherwise during the mixing. For the best results, the acid must be distributed equally throughout the mixture.

The foregoing material impregnated as aforesaid makes a good dextrine for many purposes but those skilled in the art use many different starches and mix the starch with many other materials and proportions according to the product desired and my machine is adapted to the dextrinization of all such materials which are in condition to be dried on a belt.

The tapioca flour after being impregnated with hydrochloric acid as above described in still an apparently dry powder and in that state is poured into a hopper, which hopper is refilled from time to time as it empties.

The hopper discharges through a narrow slot onto a horizontal travelling belt. A roller which is adjustable for height above the belt is located adjacent the discharge opening of the hopper to maintain a uniform layer of starch on the belt. The belt with the starch thereon passes into and through a treating chamber preferably consisting of a plurality of ovens where the starch is converted into dextrine and thence passes into a cooling chamber which prevents any further reaction in the material. The converted product thence falls from the belt into a suitable receptacle.

Referring specifically to the drawings, a charge of starch is introduced into a mixer 20 located on an upper floor of the factory and above the converting apparatus. The mixer can be of any desirable type and includes a power-driven rotatable agitating device 22 which maintains the batch of starch continuously agitated. The charge of hydrochloric acid is contained under pressure in a receptacle 24 and is sprayed in atomized form or as a mist through the pipe 26 into the mixer where, by the agitation of the starch therein, the acid is uniformly mixed with the batch of starch. The amount of acid is so small compared with the amount of starch that the acidified starch remains a powder. Quantities of acidified starch are transferred from time to time from the mixer into a hopper 28 of the converting apparatus, from which hopper starch is delivered as a continuous sheet or layer onto a horizontal, continuously moving, conveyor belt 30 located beneath the hopper.

The conveyor belt 30 is endless and passes over an idler pulley 32 close to the hopper and over a driving pulley 34 at the discharge end of the machine. The belt is preferably composed of thin sheet metal as steel and is of considerable length. The length of the belt is determined by the length of the time the material must remain on it and its speed and should be long enough to provide the longest treatment required by any material made on it. In the present instance, the length of the upper or material supporting pass of the belt is approximately fifty feet. The belt is approximately two feet wide.

The hopper has converging front and rear walls 36 and 38, respectively, and parallel upstanding side walls 40 which provide immediately above the belt a discharge orifice through which the material within the hopper is deposited upon the belt. The orifice is elongated transversely of the belt and is terminated at its opposite ends within the opposite side edges of the belt so that there are opposite marginal portions of the belt that are not occupied by the material. A plurality of rollers 42, see Figs. 2, 4 and 6, are located immediately under the orifice and provide supporting means for the moving belt which prevents the buckling of the belt due to the weight of material in the hopper on the belt. The supporting rollers are journalled in brackets 46 which are secured to longitudinally extended side bars 48 of the frame of the machine and are located under the supporting brackets 50 which are connected with the opposite side walls 40 of the hopper and which serve to support it in elevated position above the belt. The rear and front walls 38 and 36 of the hopper, respectively, are terminated a substantial distance above the top pass of the conveyor belt. The space between said belt and the rear wall is occupied and closed by a roller 52 which is journalled in blocks 54 that are vertically slidable in tracks 56 carried by the two side walls 40 of the hopper. Screws 58 bear upon said blocks to hold the roller in rolling engagement with the belt. A scraper or doctor 60 is secured adjustably to the rear wall 38 of the hopper and in engagement with the roller 52 to prevent escape of the starch from the hopper over the top of the roller. The space between the belt and the front wall 36 of the hopper is closed by a pressure roller 62 which is journalled at its ends in blocks 64, see especially Figs. 7 and 8, that are vertically slidable in tracks 66 of the side walls 40 of the hopper. The blocks 64 can be raised and lowered by means of screws 68 which are screw-threaded in rearwardly extended ears 70 of said blocks and pass through outstanding ears 72 of the side walls 40. The bearing blocks are secured in any adjusted position by clamping bolts 74 which pass through elongated slots 76 in the bearing blocks and are screw-threaded in the tracks 66. A scraper or doctor 78 is vertically slidably secured to the front face of the wall 36 and bears upon the top portion of the periphery of the roller 62 whereby to prevent escape of starch from the hopper thereover and also to remove any starch particles that may adhere to the roller. The doctor is mounted to bear yieldingly upon said roller by means including the compression springs 80 which bear upon said doctor and are placed under a tension which can be varied by screws 82 which are screw-threaded in ears 84 of the front wall 36 and which bear upon the tops of said springs. The pressure roller 62 is so adjusted that it is spaced above the upper pass of the conveyor belt by a distance equal to the thickness of the layer of starch that is required on the belt. Thus, only as much starch can pass out of the hopper as is determined by the height of the roller 62 above the belt. The roller is rotated positively at the peripheral speed of the belt by a chain 86 which passes over a sprocket wheel 88 fixed to said roller and also passes over a sprocket wheel fixed to a shaft 90, Fig. 1, extended transversely of the frame of the machine below the hopper.

The hopper preferably is provided with means to break up any arch formation of the starch that may tend to occur therein. Said means, as here shown, includes a shaft 92 journalled in bearing blocks 94 secured to the side walls 40 of the hopper and rotated by a chain 96 which passes over an idler sprocket 98 journalled in an adjustable chain-tightening bracket 100 and over a sprocket driven by the shaft 90. The shaft 92 drives a pair of bars 102, 104, which curve helically in opposite directions lengthwise of the shaft and sweep over the front and rear walls of the hopper thereby cutting through any arch formation of the starch that may tend to form a bridge between said walls and, at the same time, moves the starch in opposite directions above the orifice of the hopper whereby to distribute the starch uniformly over the belt and thereby insure a layer of starch of uniform thickness on the belt as it emerges from the hopper.

The belt, with the layer of starch thereon, passes from the hopper immediately to the first one of a series of three ovens 106, 108 and 110, respectively, which are arranged lengthwise of the belt from the hopper toward the delivery end of the apparatus. The ovens have essentially the same construction, although they are operated at different temperatures, and but one need be described.

Referring in particular to Figs. 9 through 12, the oven 106 consists essentially of a box structure which encloses the upper pass of the belt 30 and has the top wall 112 and the depending side walls 114 composed of suitable heat-insulating material and is supported on tie rods 116 which extend transversely beneath the belt 30 and are carried by the side bars 48 of the frame of the machine. A metal baffle is located within the oven and against the inner face of the insulating walls and consists of a metal plate 118 which overlies and is spaced above the conveyor belt and has depending side walls 120 which rest upon the tie rods 116. A grid comprising a flat metal plate 122 is located beneath the belt and upon said tie rods and has a plurality of apertures 124 therein through which hot gases can pass to traverse the under face of the belt. The grid is provided with upstanding side walls 126 which have passages 128 therethrough through which the gases beneath the belt can escape. A plurality of half-round bars 130 are secured to the upper faces of said side walls 126 and form supports over which the belt moves. A gas burner consisting of a perforated pipe 132 is located beneath the grid and extends lengthwise thereof and is connected at its opposite ends by valved pipes 134, Fig. 1, with a gas main 136 through an interposed gas regulating device 138. The burner is enclosed within a chamber consisting of metal-faced heat-insulating walls 140 one of which consists in part of a hinged door 142 which can be lowered to permit inspection of the gas flame in the oven. The heated gases pass through the perforations of the grid and into the space 144 above the grid and under the belt and thence pass transversely of the belt and over the opposite side edges thereof and upwardly and transversely inwardly toward the middle of the belt in the space 146 above the belt and escape from the oven through a series of valved outlet pipes 148. In this way, heat is applied to the under surface of the starch layer A on the belt and also to the upper surface thereof with the result that each particle or granule of starch in the layer receives substantially the same amount of heat at the same time and thus all granules are equally heat-treated. The open ends of the oven are closed by vertically adjustable doors comprising plates 150, see Fig. 12, which are adapted to be raised only sufficiently above the belt to permit the starch layer to pass thereunder. The top wall of the oven is provided with a roller 154 journalled on a vertically-adjustable supporting rod 156 and which is so positioned with respect to the upper face of the belt as to hold the belt against buckling upwardly.

The three ovens are disposed in close alignment so that the material as it emerges from one oven passes immediately into the next adjacent oven and receives additional treatment. Each oven is provided with an automatic temperature control including a temperature indicating and controlling device 158 which is responsive to the temperature within the oven and which controls the device 138 to regulate the supply of gas to the burner to maintain the temperature at the desired value.

Conversion of the starch to dextrine is completed within the last oven 110. The material from this oven passes immediately into a cooling chamber 160 through which cold or atmospheric air is caused to circulate above and below the belt by pipes 162 through which air is forced by a blower 164. The temperature of the dextrine is immediately lowered in the cooling chamber so that further conversion thereof is arrested. The dextrine on the belt falls off the belt into a suitable receptacle as the belt passes over the driving pulley 34. A power driven brush 168 rotates in engagement with the under pass of the belt on the pulley 34 so as to brush off any material that may tend to adhere to the belt.

The power for actuating the various parts of the apparatus is obtained from an electric motor 170 which drives a shaft 172 and, through a belt 174, the shaft 176 of a variable speed mechanism by which the speed of the conveyor belt can be adjusted to suit the temperatures of ovens and the particular product that is being manufactured. The speed-changing mechanism is of a well known type and consists essentially of cones 178 which can be moved toward and away from each other on the shaft 176 and which engage the edges of a belt 180 which belt drives cones 182 that function similarly to the cones 178 and drive the shaft 184, see Figs. 1 and 14. The shaft 184 is connected with the shaft 186 of the driving pulley 34 of the conveyor belt by means of suitable speed-reduction gears 188. The arch-breaking device and the layer forming roller of the hopper are driven from the motor 170 through the variable speed mechanism 190 which is connected with the shaft 90 so that the hopper can be operated at a speed which is correlated with the speed of the conveyor belt. The conveyor belt is maintained under suitable tension by means of the idler pulley 32. To this end, the shaft 192 of said pulley is mounted in bearing blocks 194, see Fig. 13, which are slidable in tracks 196 carried by both horizontal frame bars 48. Flexible cables 198 are connected with said blocks and pass over a series of sheaves 200 to a crossbar 202 located beneath the idler pulley and carrying a weight 204 thereby keeping the belt under tension regardless of variations in length of said belt due to changes of temperatures.

Each oven is heated to a predetermined degree which can be varied at will to suit the requirements of any particular product but the heat is preferably governed by the controlling devices mentioned which are well known in the art to maintain the oven closely at whatever temperature has been selected. The more refined the heat control is the better, but I find that three heating sections, heated by gas jets, as above described, and the cooling section cooled by air at room temperature gives me sufficient control of the process to give highly satisfactory results for the conversion of starch into dextrine.

The temperatures and belt speed must be governed by the materials used and the product desired. Those skilled in the art know very closely the highest temperature it is safe to use for their product. I find that with tapioca flour impregnated as described the heat may be adjusted to give the belt a temperature at the outlet of the first oven of 280° F., at the outlet of the second oven of 300° F., and at the outlet of the third oven at 320° F. The fourth section 160 is merely for cooling the material promptly so that the material will not be overconverted. As above stated, air at ordinary room temperature may be used for cooling.

More heat should be supplied in the first section as the heat has to vaporize the moisture in the material as well as raise the temperature thereof. In the second section, the dextrinization proceeds and is finished in the third section, preferably at the highest safe temperature. I have used various belt speeds. More than five feet per minute is easily obtained. The faster the belt the more heat must be supplied but speed is limited by the fact that the material must not be overheated, and heat must be enough to convert the dextrine no matter what the speed. Tapioca starch can be dextrinized commercially much more perfectly by the above method than by any other method known to me.

My machine may be used to treat not only impregnated material but starch which has not been impregnated and also to give a second treatment to starch mixtures or derivatives which have already been once treated by my machine or otherwise.

The layer of starch on the conveyor belt should be relatively thin and for the conversion of tapioca flour to dextrine should not be much more than one-eighth of an inch. There is no harm in having the starch layer thinner than this but as a thin layer reduces the output of the machine, I prefer to run the layer as thick as I can so long as I am assured that all granules of starch will receive uniform treatment so that all granules will be equally converted to dextrine. If the layer is too thick all particles of the layer will not receive the same heat treatment so that the product will not be uniform but with a sufficiently thin layer all granules will receive the same heat at the same time so that a uniformity of product, heretofore commercially unattained, is assured.

It is obvious that if perfect uniformity of product is not required my machine may be used without all of the desirable features here explained. For instance, the layer may be too thick for a perfect product and yet the machine will produce a large output of dextrine sufficiently good for many purposes. Furthermore, those skilled in the art, following the principles herein disclosed, may choose to use thinner layers of material, more exact heat control, or other variations to produce a more perfect product.

While I have specifically described the operation of my machine for the conversion of starch to dextrine, it will be apparent that other products can be made, and other materials treated by the machine.

I claim:

1. In a machine for the conversion of starch and the like, the combination of an imperforate travelling belt adapted to carry the material to be converted horizontally from one end to the other of the apparatus without disturbance or change of formation, means for driving the belt, a feed hopper means for forcing the material to be converted uniformly through an outlet slot onto said belt, at a speed depending on the speed of the belt, a levelling device spaced above the belt operated at a peripheral speed equal to the speed of the belt pressing on the belt beyond the outlet adapted to level the material and press it against the belt, means to control the pressure of the levelling device, a chamber through which the belt passes carrying the material, means for heating said chamber, and means for controlling said heat.

2. Apparatus for converting starch and the like, including a horizontal continuously moving imperforate metal conveyor belt, means to deposit a uniformly thin continuous layer of starch upon said belt, an oven through which the starch layer is carried by said belt for heating and converting the starch, said oven having means to pass a heating gas from the middle of said belt outwardly toward the opposite side edges thereof and under and in heating contact with said belt and over the side edges and inwardly toward the middle of said belt and over and in heating relation with the starch layer thereon.

3. Apparatus for converting starch and the like including a horizontal continuously-moving imperforate metal conveyor belt, means to deposit a uniformly thin continuous layer of starch on said belt, an oven through which said starch layer is carried to convert the starch, said oven having means to pass a heating gas under and in heat-imparting relation with said belt, and thence over and in heat-imparting relation with said starch layer on said belt, and a cooling chamber into which said heated starch layer is moved having means to pass a cooling medium both under and over said belt and in cooling relation with both sides of the starch layer.

4. A starch converting apparatus comprising an endless, imperforate, heat-conducting, continuously-advancing horizontal belt, a series of ovens through which said belt passes in succession, a hopper for starch-containing material in powder form disposed immediately above said belt in advance of said ovens, and means located at the outlet of said hopper and spaced above said belt for laying the material in said hopper in a thin continuous compacted layer of uniform thickness on said belt, which belt conveys the layer without change of formation through said ovens, and means for regulating the speed of said belt and the heat of said ovens.

5. Starch converting apparatus as defined in claim 4 wherein the layer-forming means comprises a roll which extends across and is spaced above said belt and has means which rotates it at the same peripheral speed and in the same direction as the linear speed of the belt.

6. Starch converting apparatus as defined in claim 4 wherein said hopper has an open bottom which is closed by said belt and has means to distribute the starch uniformly upon and over the surface of said belt, and a roller which is spaced above said belt and which lays the starch material on the belt in a layer of uniform thickness.

7. Starch converting apparatus as defined in claim 4 wherein at least one of said ovens has heating means and circulation-control means for the heated gases so arranged that the heated gas is caused to flow transversely of the moving belt and outwardly thereunder to both side edges thereof and transversely and inwardly thereover from both side edges thereof.

8. Starch converting apparatus as defined in claim 4 wherein a cooling chamber is arranged in line with the series of ovens and through which the heated layer on the belt is conveyed without change of formation from the last oven, and means to maintain a cool atmosphere in said chamber.

9. In material conveying and heating apparatus, the combination of a horizontal conveyor belt on which the material is supported, and an oven through which the belt passes having heating means located in said oven under and in the median line of the belt and exhaust passages for the heated gas located above and in the median line of the belt, there being passages at the sides of the belt connecting the portions of the oven above and below the belt so that the heated gas is caused to pass outwardly in opposite directions from the middle of the belt and thereunder to both edges of the belt and thence inwardly over the belt from both side edges thereof.

10. In material conveying and heating apparatus having a horizontal imperforate conveyor belt on which the material is supported, the combination therewith of an oven through which the belt passes having a horizontal apertured plate under the belt, a heating device under the middle of said plate, a plurality of spaced belt supports arranged above said plate and under said belt, the space between said plate and belt being in communication with the interior of the oven both above and below said belt at the edges of said belt, and means providing exhaust passages for the heated gas from the oven above and in the median line of said belt.

11. Starch converting apparatus comprising an endless imperforate metal belt, rotatable means for supporting the upper pass of the belt horizontally and flat so as to convey a layer of starch thereon without disturbance or change of formation, a hopper having an open bottom disposed over one end of said belt and adapted to hold a body of starch on the belt, a layer forming roll located above the belt at the outlet of the hopper and arranged to form on the moving belt a uniformly thin continuous layer of starch, arch-breaking means located in said hopper to break up any arch formation therein and to distribute the starch uniformly upon the belt, an oven, means for advancing the belt with the starch layer thereon at a uniform predetermined rate of speed through said oven, and oven heating means arranged to circulate heated gaseous products of combustion transversely in opposite directions under the belt to the opposite sides thereof and thence above the belt from both sides towards the middle thereof.

12. Starch converting apparatus as defined in claim 11 wherein the uniformly thin continuous layer of starch on the horizontal belt is compacted by said layer forming roll.

13. A starch converting apparatus comprising an endless, imperforate, heat-conducing continuously-advancing belt, means for supporting the upper pass of said belt horizontally and flat so as to convey a layer of starch thereon without disturbance or change of formation, means including a hopper for maintaining a supply of starch on the advancing belt, a layer-forming roll located above said belt and transversely thereof in front of the supply of starch on said belt and having means for predetermining independently the height of each end of said roll above said belt to form on the moving belt a uniformly thin continuous layer of starch, an oven, means for advancing the belt with the starch layer thereon at a uniform predetermined rate of speed through said oven without disturbance of the starch layer, and means to heat said oven.

In testimony whereof, I have signed my name to this specification.

NATHAN CARLETON PHILLIPS.